United States Patent
Wu et al.

(10) Patent No.: US 12,548,122 B2
(45) Date of Patent: Feb. 10, 2026

(54) METHOD FOR FILTERING PERIODIC NOISE AND FILTER USING THE METHOD

(71) Applicant: Coretronic Corporation, Hsin-Chu (TW)

(72) Inventors: Huai-En Wu, Hsin-Chu (TW); Jia-Hua Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 692 days.

(21) Appl. No.: 17/701,699

(22) Filed: Mar. 23, 2022

(65) Prior Publication Data
US 2022/0309620 A1 Sep. 29, 2022

(30) Foreign Application Priority Data
Mar. 25, 2021 (CN) .......................... 202110319606.1

(51) Int. Cl.
*G06T 5/70* (2024.01)
*G06T 5/10* (2006.01)

(52) U.S. Cl.
CPC .................. *G06T 5/70* (2024.01); *G06T 5/10* (2013.01); *G06T 2207/20024* (2013.01); *G06T 2207/20056* (2013.01); *G06T 2207/20076* (2013.01)

(58) Field of Classification Search
None
See application file for complete search history.

(56) References Cited

U.S. PATENT DOCUMENTS 6,333,990 B1   12/2001   Yazici et al.
10,826,464 B2 * 11/2020   Zhuang ................... G06F 17/14
(Continued)

FOREIGN PATENT DOCUMENTS

CN   101743565   6/2010
CN   103001638   3/2013
(Continued)

OTHER PUBLICATIONS

Lori L. Barski and Xiaohui Wang, "Characterization, detection and suppression of stationary grids in digital projection radiography imagery," Proceedings of the SPIE, vol. 3658 Medical Imaging 1999: Image Display, May 1999, pp. 502-519.
(Continued)

*Primary Examiner* — Jiangeng Sun
(74) *Attorney, Agent, or Firm* — JCIPRNET

(57) ABSTRACT

A method for filtering periodic noise and a filter using the method are provided. The method includes: obtaining an input signal; detecting a fundamental frequency corresponding to a maximum peak in a spectrum of the input signal, detecting a harmonic frequency according to the fundamental frequency, and detecting an aliasing frequency corresponding to the harmonic frequency in response to the harmonic frequency corresponding to the fundamental frequency being greater than a Nyquist frequency of the input signal; filtering the fundamental frequency and at least one of the harmonic frequency and the aliasing frequency of the spectrum to generate a first filtered spectrum, and restoring the input signal according to the first filtered spectrum to generate an output signal; and outputting the output signal. The method for filtering the periodic noise and the filter using the method may filter the periodic noise in the input signal affected by an aliasing effect.

14 Claims, 6 Drawing Sheets

(56) References Cited

U.S. PATENT DOCUMENTS

| | | | | |
|---|---|---|---|---|
| 2005/0031182 | A1* | 2/2005 | Inoue | G06T 5/70 |
| | | | | 348/E5.086 |
| 2006/0239389 | A1* | 10/2006 | Coumou | H03M 1/0836 |
| | | | | 375/346 |
| 2008/0015785 | A1* | 1/2008 | Mujezinovic | G01N 33/6848 |
| | | | | 702/19 |
| 2008/0079623 | A1* | 4/2008 | Xu | G01R 23/16 |
| | | | | 341/155 |
| 2021/0224955 | A1* | 7/2021 | Chen | G06T 5/10 |

FOREIGN PATENT DOCUMENTS

| | | | | |
|---|---|---|---|---|
| CN | 110596458 | A * | 12/2019 | G01R 23/165 |
| TW | 200806950 | | 2/2008 | |
| TW | 200830724 | | 7/2008 | |

OTHER PUBLICATIONS

I. N. Belykh and C.W. Cornelius, "Antiscatter stationary grid artifacts automated detection and removal in projection radiography images," Proceedings of the SPIE, vol. 4322 Medical Imaging 2001: Image Processing, Jul. 2001, pp. 1162-1166.

Igor Aizenberg and Constantine Butakoff, "Frequency Domain Median-like Filter for Periodic and Quasi- Periodic Noise Removal," Proceedings of the SPIE, vol. 4667 Image Processing: Algorithms and Systems, May 2002, pp. 1-11.

Chih-Yang Lin; et al., "A Study of Grid Artifacts Formation and Elimination in Computed Radiographic Images," Journal of Digital Imaging, vol. 19, No. 4, Dec. 2006, pp. 351-361.

"Office Action of China Counterpart Application", issued on Oct. 26, 2024, pp. 1-7.

* cited by examiner

METHOD FOR FILTERING PERIODIC NOISE AND FILTER USING THE METHOD

CROSS-REFERENCE TO RELATED APPLICATION

This application claims the priority benefit of China application serial no. 202110319606.1, filed on Mar. 25, 2021. The entirety of the above-mentioned patent application is hereby incorporated by reference herein and made a part of this specification.

BACKGROUND

Technical Field

The disclosure relates to a method for filtering periodic noise and a filter using the method.

Description of Related Art

In the field of image processing, how to filter periodic noise in an image while retaining information in the image is one of the targets that persons skilled in the art are committed to researching. The periodic noise in the image includes, for example, a fringe pattern or a grid pattern. In addition, the high frequency signal in the image may be affected by the sampling resolution to generate a Moiré pattern. In the Fourier spectrum, the periodic noise is often presented in the form of impulse. When the intensity of the periodic noise is sufficient, in addition to the component of the periodic noise at the fundamental frequency, the component of the periodic noise at the harmonic frequency also has a significant impact on the image signal. FIG. 1A is a spectrum diagram of the fundamental frequency and the harmonic frequency of the periodic noise, where $f_1$ is the fundamental frequency of the periodic noise, $2f_1$ is the second harmonic frequency of the periodic noise, and $3f_1$ is the third harmonic frequency of the periodic noise.

During the process of executing the Fourier transform, the effective bandwidth of the spectrum is half of the sampled frequency, and half of the sampled frequency may be referred to as the Nyquist frequency. When the sampled frequency satisfies the Nyquist sampling theorem, that is, as long as the Nyquist frequency is higher than the highest frequency of the sampled signal, the aliasing effect may be avoided. Therefore, to sample a signal with a specific frequency, it is necessary to use a sampled frequency equal to (or more than) twice the specific frequency to obtain the complete information of the signal. If the sampled frequency is too low, the sampled waveforms may overlap each other. For example, the high frequency portion (HFP) of the signal may be aliased to the low frequency portion (LFP) of the signal, which generates the aliasing effect. FIG. 1B is a spectrum diagram affected by the aliasing effect. Since the third harmonic frequency of the periodic noise exceeds the Nyquist frequency $f_N$ (half of the sampled frequency) of an input signal, the third harmonic is aliased to the frequency band of the second harmonic.

In order to filter the periodic noise in the image, a known method may filter the periodic noise through a low-pass filter or a band-pass filter. However, although the low-pass filter can remove specific high frequency noise, the HFP of the image may be removed at the same time. Although the band-pass filter can remove narrow bandwidth noise, the ringing effect may result, which affects sharp edges in the image. On the other hand, another known method may suppress the interference of the periodic noise on a specific frequency band of the image through a median filter or a two-dimensional Gaussian band-stop filter. However, the method may result in the filtering of non-noise information in the specific frequency band.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a method for filtering periodic noise and a filter using the method, which can filter the periodic noise in an input signal affected by an aliasing effect.

A filter for filtering periodic noise of the disclosure includes a processor, a storage medium, and a transceiver. The storage medium stores multiple modules. The processor is coupled to the storage medium and the transceiver, and accesses and executes the multiple modules. The multiple modules include a data collection module, a detection module, a filter module, and an output module. The data collection module obtains an input signal through the transceiver. The detection module detects a fundamental frequency corresponding to a maximum peak in a spectrum of the input signal. The detection module detects a harmonic frequency according to the fundamental frequency, and detects an aliasing frequency corresponding to the harmonic frequency in response to the harmonic frequency corresponding to the fundamental frequency being greater than a Nyquist frequency of the input signal. The filter module filters the fundamental frequency and at least one of the harmonic frequency and the aliasing frequency of the spectrum to generate a first filtered spectrum, and restores the input signal according to the first filtered spectrum to generate an output signal. The output module outputs the output signal through the transceiver.

A method for filtering periodic noise of the disclosure includes the following steps. An input signal is obtained. A fundamental frequency corresponding to a maximum peak in a spectrum of the input signal is detected, a harmonic frequency is detected according to the fundamental frequency, and an aliasing frequency corresponding to the harmonic frequency is detected in response to the harmonic frequency corresponding to the fundamental frequency being greater than a Nyquist frequency of the input signal. The fundamental frequency and at least one of the harmonic frequency and the aliasing frequency of the spectrum are filtered to generate a first filtered spectrum, and the input signal is restored according to the first filtered spectrum to generate an output signal. The output signal is output.

Based on the above, the method and the filter of the disclosure may detect the fundamental frequency, the harmonic frequency, or the aliasing frequency of the periodic noise in the input signal, and may weaken the energy of the periodic noise at the frequencies according to the average energy of frequency bands close to the frequencies, thereby effectively and smoothly suppress the interference of the periodic noise.

Other objectives, features and advantages of the present invention will be further understood from the further technological features disclosed by the embodiments of the disclosure wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
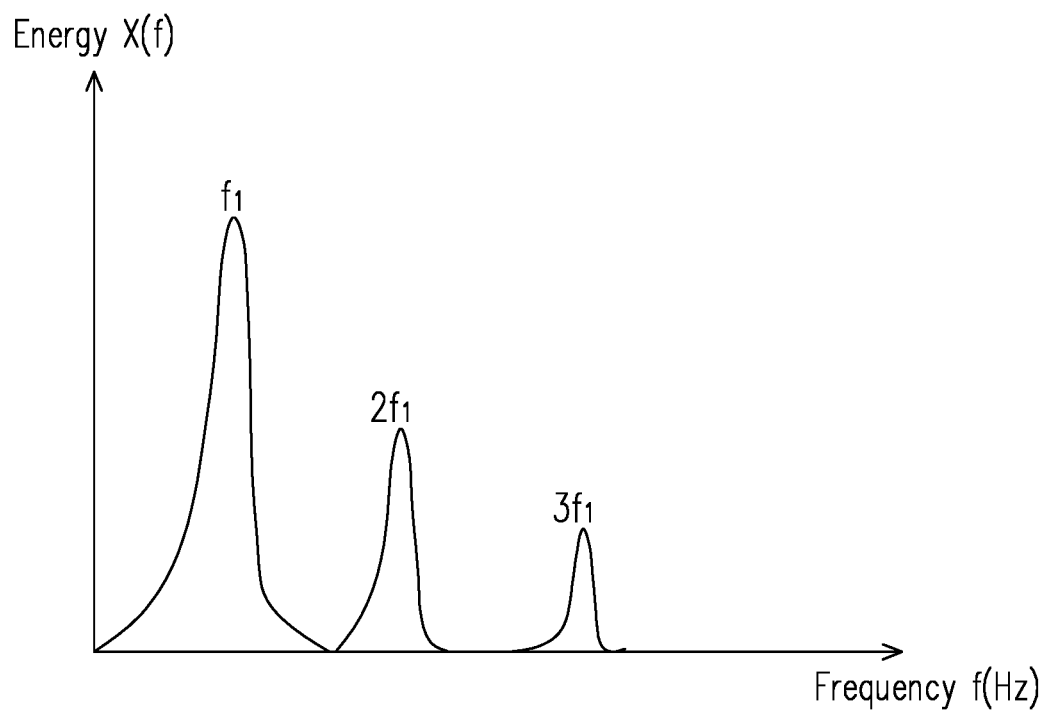
FIG. 1A is a spectrum diagram of a fundamental frequency and a harmonic frequency of periodic noise.
Figure 1B:
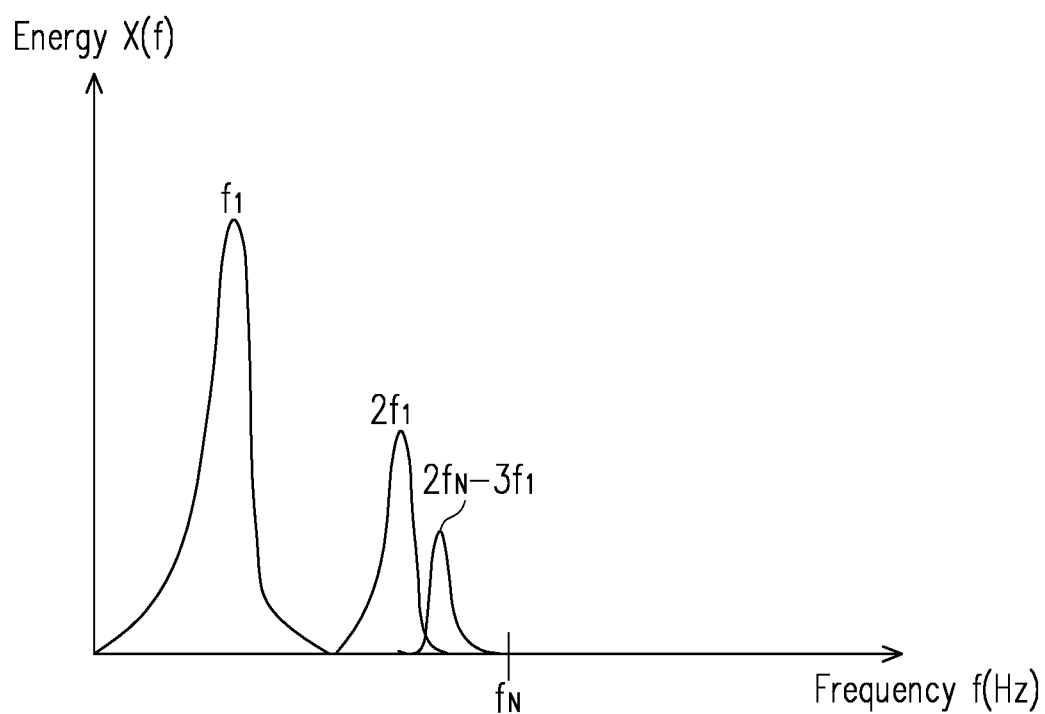
FIG. 1B is a spectrum diagram affected by an aliasing effect.
Figure 2:
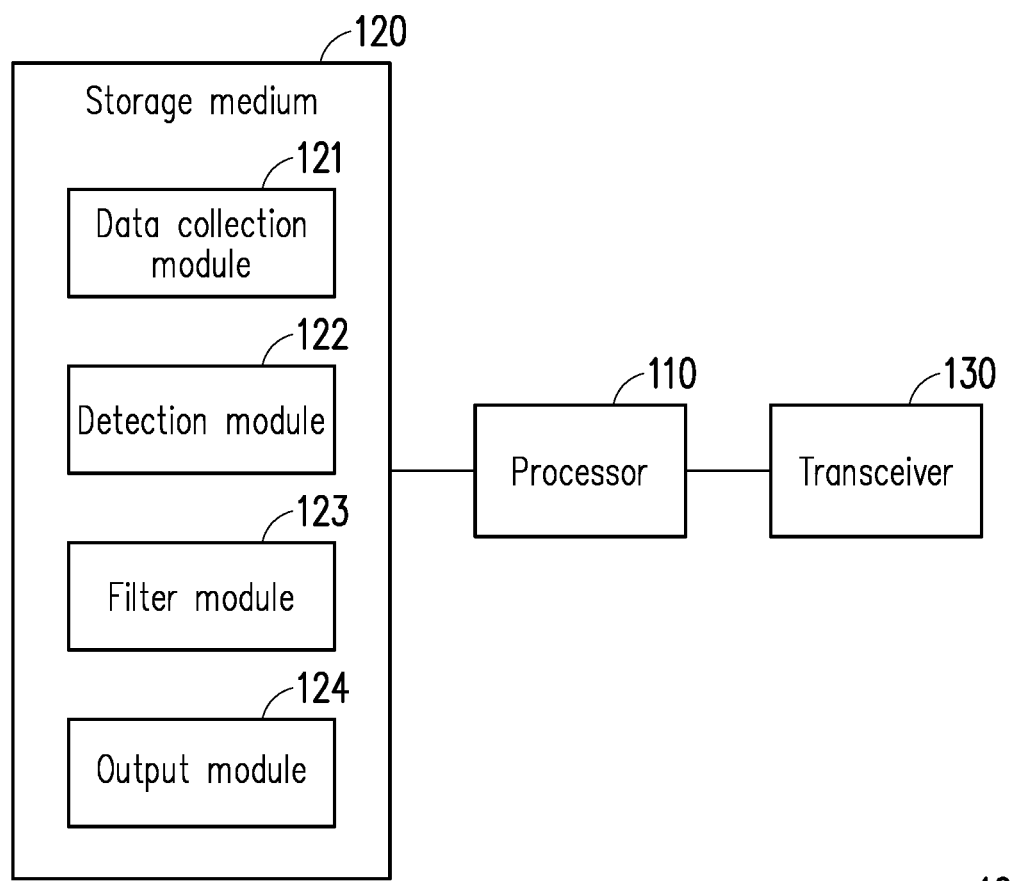
FIG. 2 is a schematic diagram of a filter for filtering periodic noise according to an embodiment of the disclosure.

FIG. 2 is a schematic diagram of a filter 100 for filtering periodic noise according to an embodiment of the disclosure. The filter 100 may filter the periodic noise included in an input signal affected by an aliasing effect. The filter 100 may include a processor 110, a storage medium 120, and a transceiver 130.

The processor 110 is, for example, a central processing unit (CPU), other programmable general purpose or specific purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), other similar elements, or a combination of the above elements. The processor 110 may be coupled to the storage medium 120 and the transceiver 130, and access and execute multiple modules and various applications stored in the storage medium 120.

The storage medium 120 is, for example, any type of fixed or removable random access memory (RAM), read-only memory (ROM), flash memory, hard disk drive (HDD), solid state drive (SSD), similar elements, or a combination of the above elements, and is configured to store the multiple modules or various applications executable by the processor 110. In this embodiment, the storage medium 120 may store multiple modules including a data collection module 121, a detection module 122, a filter module 123, an output module 124, etc., and functions thereof will be described later.

The transceiver 130 transmits and receives a signal in a wireless or wired manner. The transceiver 130 may also execute operations such as low noise amplification, impedance matching, frequency mixing, up or down frequency conversion, filtering, and amplification. The transceiver 130 includes, for example, a device that may execute a circuit with the above functions.

Figure 3:
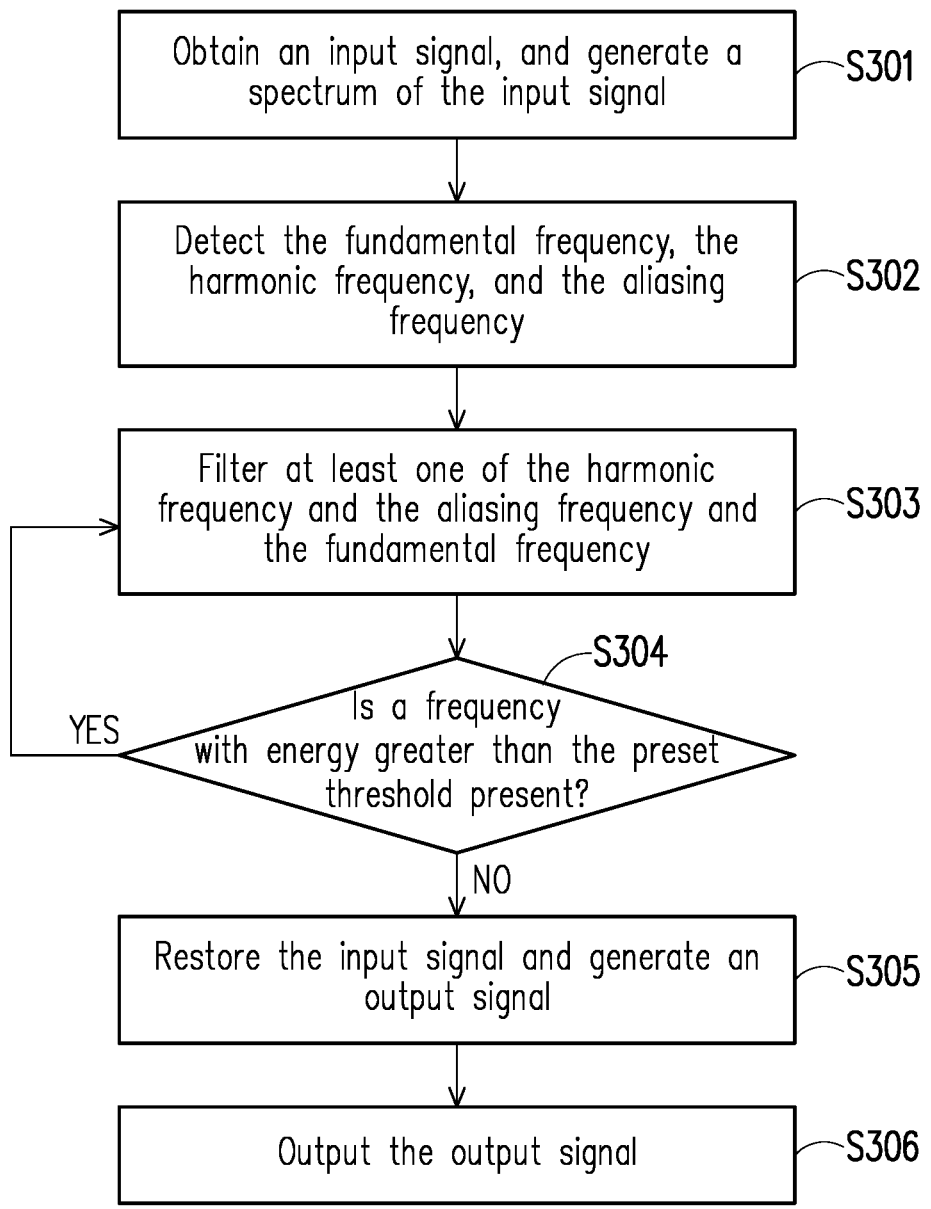
FIG. 3 is a flowchart of a method for filtering periodic noise of an input signal according to an embodiment of the disclosure.
Figure 4A:
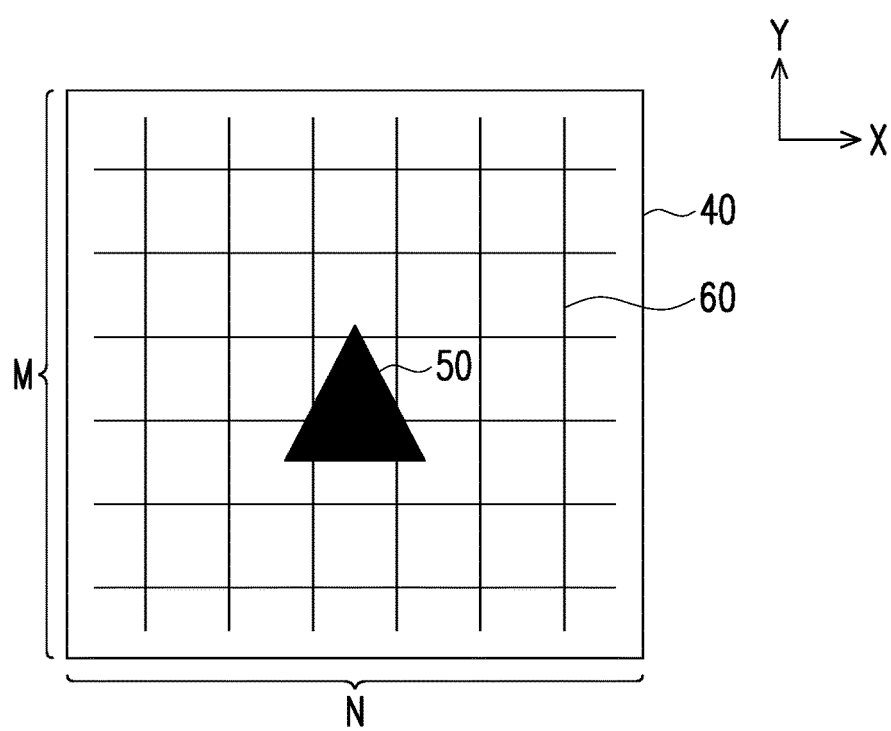
FIG. 4A is a schematic diagram of an image including periodic noise according to an embodiment of the disclosure.
Figure 4B:
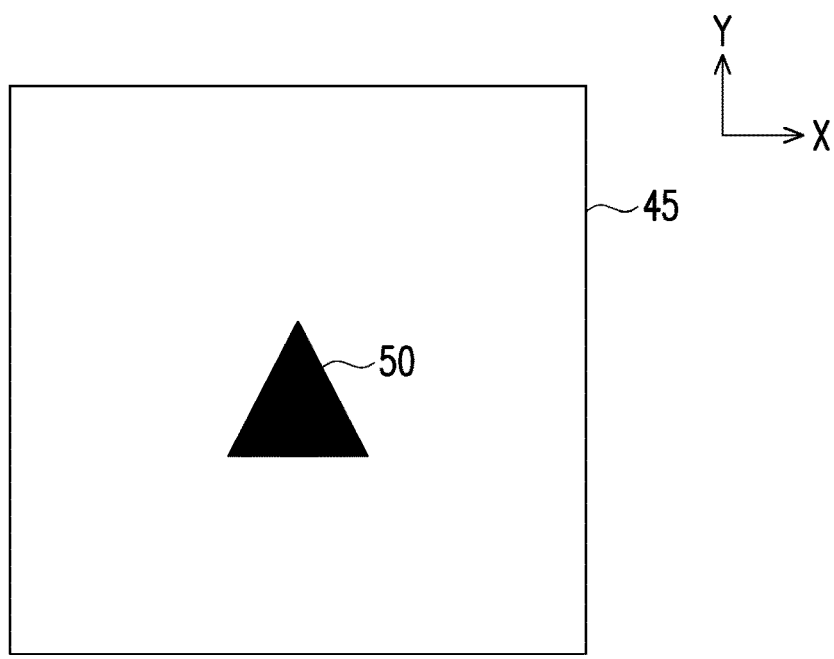
FIG. 4B is a schematic diagram of an image with periodic noise filtered according to an embodiment of the disclosure.

FIG. 3 is a flowchart of a method for filtering periodic noise of an input signal according to an embodiment of the disclosure. The method may be implemented by the filter 100 shown in FIG. 2. If the input signal is an image signal, the filter 100 may implement the method as shown in FIG. 3 to filter a grid pattern generated by periodic noise in an image corresponding to the input signal, and retain details in the image. FIG. 4A is a schematic diagram of an image 40 including periodic noise according to an embodiment of the disclosure. FIG. 4B is a schematic diagram of an image 45 with periodic noise filtered according to an embodiment of the disclosure. It is assumed that the input signal corresponds to the image 40 as shown in FIG. 4A, and the image 40 includes a non-noise object 50 and a grid pattern 60 generated by the periodic noise. The filter 100 may remove the grid 60 from the image 40 while retaining the details of the image 40, thereby generating the image 45 shown in FIG. 4B. Therefore, the object 50 in the image 45 is not distorted.

With reference to FIG. 3, in Step S301, the data collection module 121 of the storage medium 120 may obtain an input signal through the transceiver 130, and the input signal is transmitted to the detection module 122. The detection module 122 may generate a spectrum of the input signal. The input signal corresponds to an image. Specifically, after the data collection module 121 obtains the input signal in a time domain through the transceiver 130, the detection module 122 may perform a one-dimensional fast Fourier transform on the input signal to generate the spectrum.

Taking FIG. 4A as an example, if the image 40 (that is, the input signal) is not a grayscale image, the detection module 122 may convert the image 40 into a grayscale image. Then, the detection module 122 may obtain a partial image from the image 40, and may perform a one-dimensional fast Fourier transform (FFT) on the partial image of the image 40 to generate a spectrum corresponding to the partial image. The definition of the partial image may be adjusted according to usage requirements, which is not limited by the disclosure. Since the detection module 122 needs to perform the one-dimensional fast Fourier transform on the partial image, the length and the width of the partial image respectively need to be 2 to the power of n, where n is a positive integer. If the length or the width of the partial image is not 2 to the power of n, the detection module 122 may perform zero fill on the length or the width of the partial image, so that the length or the width becomes 2 to the power of n. The spectrum of the partial image with small size may include a smaller frequency range. When the periodic noise in the input signal is significant, the partial image with small size is sufficient for the detection module 122 to detect a fundamental frequency of a periodic signal. Defining the partial image as a small-sized image may reduce the amount of computation required to perform the one-dimensional fast Fourier transform. Relatively speaking, defining the partial image as a large-sized image may increase the amount of computation required to perform the one-dimensional fast Fourier transform, but the spectrum of the partial image with large size may include a larger frequency range.

In an embodiment, assuming that the image 40 is composed of N*M pixels (where N and M are positive integers and N*M is 2 to the power of n), the detection module 122 may capture a component of the image 40 in an X direction to obtain the partial image. For example, the detection module 122 may capture N pixels of the image 40 arranged along the X direction as the partial image. Coordinates of the N pixels on the image 40 may respectively be (1, m), (2, m), . . . , (N−1, m), and (N, m), where m is a positive integer less than or equal to M. As another example, the detection module 122 may capture M pixels of the image 40 arranged along a Y direction as the partial image. Coordinates of the M pixels of the image 40 may respectively be (n, 1), (n, 2), . . . , (n, M−1), and (n, M), where n is a positive integer less than or equal to N.

In Step S302, the detection module 122 may detect the fundamental frequency, the harmonic frequency, and the aliasing frequency of the periodic noise in the spectrum. The detection module 122 may detect the fundamental frequency in an [$f_{min}$, $f_N$] interval of the spectrum, where $f_{min}$ is the minimum frequency at which the periodic noise may appear in the spectrum, and $f_N$ is the Nyquist frequency of the spectrum. The detection module 122 may detect the harmonic frequency in an [$2f_1$, $f_{max}$] interval of the spectrum, where $2f_1$ is the frequency of a first harmonic of the periodic noise, and $f_{max}$ is the maximum frequency at which the harmonic of the periodic noise is still present. Due to the possible occurrence of the aliasing effect, the frequency $f_{max}$ may be greater than the Nyquist frequency $f_N$ and less than the sampled frequency $f_S$ of the spectrum.

Figure 5:
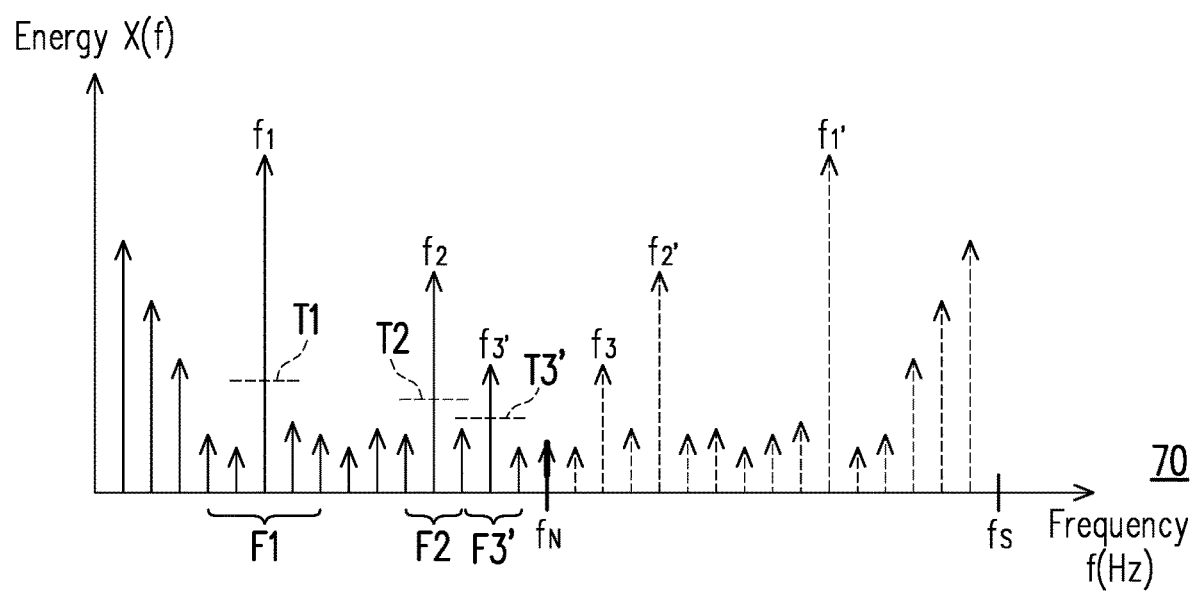
FIG. 5 is a schematic diagram of a spectrum corresponding to a partial image according to an embodiment of the disclosure.

FIG. 5 is a schematic diagram of a spectrum 70 corresponding to a partial image according to an embodiment of the disclosure, where $f_S$ is the sampled frequency of the input signal and $f_N$ is the Nyquist frequency of the input signal. First, the detection module 122 may detect a fundamental frequency $f_1$ of the periodic noise in the spectrum 70. In an embodiment, the detection module 122 may obtain the maximum peak in the spectrum 70, and define the frequency corresponding to the maximum peak as the fundamental frequency $f_1$ of the periodic noise. Next, the detection module 122 may detect harmonic frequencies $f_2$ and $f_3$ of the periodic noise according to the fundamental frequency $f_1$, where the harmonic frequencies $f_2$ and $f_3$ may be integer multiples of the fundamental frequency $f_1$. For example, if the harmonic frequency $f_2$ corresponds to a second harmonic of the periodic noise, the harmonic frequency $f_2$ may be twice the fundamental frequency $f_1$. If the harmonic frequency $f_3$ corresponds to a third harmonic of the periodic noise, the harmonic frequency $f_3$ may be thrice the fundamental frequency $f_1$.

The detection module 122 may also detect the aliasing frequency of the periodic noise in the spectrum 70. If the harmonic frequency of the periodic noise is greater than the Nyquist frequency $f_N$ of the input signal (that is, the image 40), the harmonic is within the Nyquist frequency $f_N$, and an aliasing frequency $f_3'$ is generated. The harmonic frequency $f_3$ and the aliasing frequency $f_3'$ are symmetrical to the Nyquist frequency $f_N$. Taking FIG. 5 as an example, the detection module 122 may detect the aliasing frequency $f_3'$ symmetrical to the Nyquist frequency $f_N$ with the harmonic frequency $f_3$ according to the harmonic frequency $f_3$ greater than the Nyquist frequency $f_N$.

In particular, FIG. 5 is the case where the Nyquist frequency is $f_N$, the solid line portions $f_1$, $f_2$, and $f_3'$ are the state of the image 40 affected by the aliasing effect, which may be referred to as positive frequencies. The dashed line portions $f_1'$, $f_2'$, and $f_3$ are image frequencies, which may be referred to as negative frequencies. The positive frequencies and the negative frequencies are symmetrical to the Nyquist frequency $f_N$. In other words, the positive frequencies are portions detectable by the detection module 122, and the negative frequencies are portions which cannot be detected by the detection module 122.

In Step S303, the filter module 123 may filter the fundamental frequency and at least one of the harmonic frequency and the aliasing frequency.

As shown in FIG. 5, the filter module 123 may select a frequency band F1 corresponding to the fundamental frequency $f_1$ from the spectrum 70, and calculate the average energy of the frequency band F1. The filter module 123 may set the average energy as a threshold T1, and remove noise of the frequency band F1 greater than the threshold T1, thereby reducing the energy of the fundamental frequency $f_1$. The frequency band F1 may include one or more frequency bands adjacent to the fundamental frequency $f_1$. For example, the fundamental frequency $f_1$ may be the center frequency of the frequency band F1. The starting point of the frequency band F1 may be the fundamental frequency $f_1$ minus a first preset frequency band. The end point of the frequency band F1 may be the fundamental frequency $f_1$ plus a second preset frequency band.

The filter module 123 may select a frequency band F2 corresponding to the harmonic frequency $f_2$ from the spectrum 70, and calculate the average energy of the frequency band F2. The filter module 123 may set the average energy as a threshold T2, and remove noise of the frequency band F2 greater than the threshold T2, thereby reducing the energy of the harmonic frequency $f_2$. The frequency band F2 may include one or more frequency bands adjacent to the harmonic frequency $f_2$. For example, the harmonic frequency $f_2$ may be the center frequency of the frequency band F2. The starting point of the frequency band F2 may be the harmonic frequency $f_2$ minus a third preset frequency band. The end point of the frequency band F2 may be the harmonic frequency $f_2$ plus a fourth preset frequency band.

The filter module 123 may select a frequency band F3' corresponding to the aliasing frequency $f_3'$ from the spectrum 70, and calculate the average energy of the frequency band F3'. The filter module 123 may set the average energy as a threshold T3', and remove noise of the frequency band F3' greater than the threshold T3', thereby reducing the energy of the aliasing frequency $f_3'$. The frequency band F3' may include one or more frequency bands adjacent to the aliasing frequency $f_3'$. For example, the aliasing frequency $f_3'$ may be the center frequency of the frequency band F3'. The starting point of the frequency band F3' may be the aliasing frequency $f_3'$ minus a fifth preset frequency band. The end point of the frequency band F3' may be the aliasing frequency $f_3'$ plus a sixth preset frequency band. In other cases, if the harmonic frequency $f_3$ or the aliasing frequencies $f_1'$ and $f_2'$ are present in the positive frequencies, the filter module 123 may reduce the energy thereof based on the above similar method.

In Step S304, the detection module 122 may determine whether a frequency with energy greater than the preset threshold is present in the filtered spectrum 70 (also referred to as a "first filtered spectrum"). If the frequency greater than the preset threshold is present in the filtered spectrum 70, Step S302 is executed again. If no frequency greater than the preset threshold is present in the filtered spectrum 70, Step S305 is proceeded.

If the frequency greater than the preset threshold is present in the filtered spectrum 70, it means that other periodic signals that have not been filtered are present in the image 40. Therefore, the filter 100 needs to execute Step S302 and Step S303 again to filter the other periodic signals. Specifically, in Step S302, the detection module 122 may detect a secondary fundamental frequency, a secondary harmonic frequency, and a secondary aliasing frequency of the periodic noise in the filtered spectrum 70. The secondary fundamental frequency may correspond to a secondary maximum peak in the spectrum 70, and the secondary maximum peak may be less than the maximum peak. In Step S303, the filter module 123 may filter the secondary fundamental frequency and at least one of the secondary harmonic frequency and the secondary aliasing frequency to generate a new filtered spectrum 70 (also referred to as a "second filtered spectrum").

If no frequency greater than the preset threshold is present in the filtered spectrum 70, in Step S305, the filter module 123 may perform a one-dimensional inverse fast Fourier transform (IFFT) on the filtered spectrum 70 to restore the input signal and generate an output signal.

In Step S306, the output module 124 receives the output signal from the filter module 123 and may output the output signal through the transceiver 130. The output signal corresponds to the image 45 as shown in FIG. 4B.

The filter 100 may repeatedly implement the method shown in FIG. 3 on the image 40 to filter the periodic noise of each partial image of the image 40 until the periodic noise is no longer present in each of the N*M pixels of the image 40.

Figure 6:
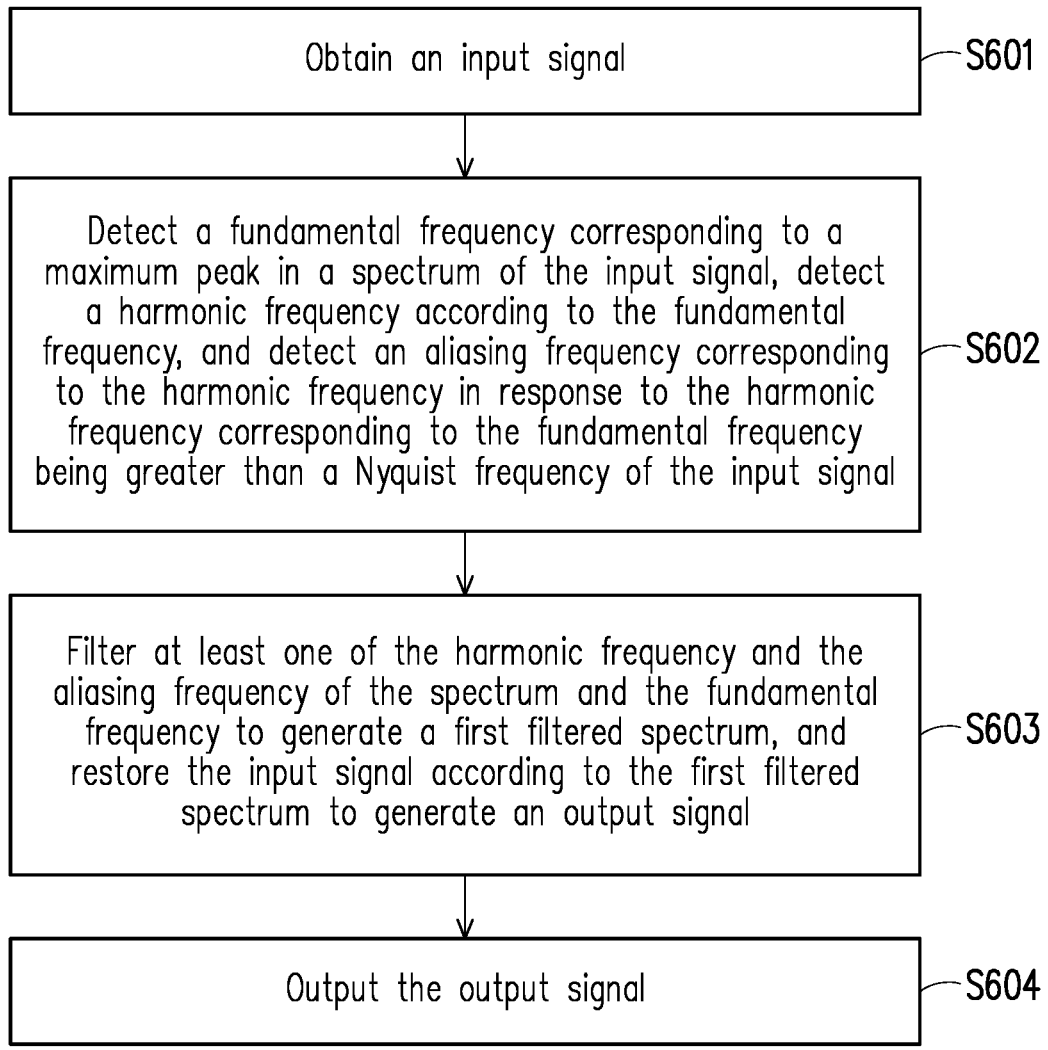
FIG. 6 is a flowchart of a method for filtering periodic noise according to an embodiment of the disclosure.

FIG. 6 is a flowchart of a method for filtering periodic noise according to an embodiment of the disclosure. The method may be implemented by the filter 100 shown in FIG. 2. In Step S601, an input signal is obtained. In Step S602, a fundamental frequency corresponding to a maximum peak in a spectrum of the input signal is detected, a harmonic frequency is detected according to the fundamental frequency, and an aliasing frequency corresponding to the harmonic frequency is detected in response to the harmonic frequency corresponding to the fundamental frequency being greater than a Nyquist frequency of the input signal. In other words, the detection of the harmonic frequency is based on the fundamental frequency, and the detection of the aliasing frequency is based on the harmonic frequency and the Nyquist frequency of the input signal. In Step S603, the fundamental frequency and at least one of the harmonic frequency and the aliasing frequency of the spectrum are filtered to generate a first filtered spectrum, and the input signal is restored according to the first filtered spectrum to generate an output signal. In Step S604, the output signal is output.

In summary, the disclosure may detect the fundamental frequency, the harmonic frequency, or the aliasing frequency of the periodic noise in the input signal, and may weaken the energy of the periodic noise at the frequencies according to the average energy of the frequency bands close to the frequencies. In addition to filtering the periodic noise with larger energy, the disclosure may also filter the periodic noise with smaller energy. Therefore, the disclosure may effectively and smoothly suppress the interference of the periodic noise. The disclosure may filter the periodic noise while retaining the high frequency information of the input signal and reducing the influence of the ringing effect on sharp edges in the image. Taking image signal processing as an example, the disclosure may effectively remove the grid pattern caused by the periodic noise in the image and may retain the details in the image.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A filter for filtering periodic noise, comprising a transceiver, a storage medium, and a processor, wherein
the storage medium stores a plurality of modules; and
the processor is coupled to the storage medium and the transceiver, and accesses and executes the plurality of modules, wherein the plurality of modules comprises a data collection module, a detection module, a filter module, and an output module, wherein
the data collection module obtains an input signal through the transceiver;
the detection module detects a fundamental frequency corresponding to a maximum peak in a spectrum of the input signal, detects a harmonic frequency according to the fundamental frequency, and detects an aliasing frequency corresponding to the harmonic frequency in response to the harmonic frequency corresponding to the fundamental frequency being greater than a Nyquist frequency of the input signal;

the filter module filters the fundamental frequency and at least one of the harmonic frequency and the aliasing frequency of the spectrum to generate a first filtered spectrum, and restores the input signal according to the first filtered spectrum to generate an output signal; and the output module outputs the output signal through the transceiver, wherein the filter module selects a first frequency band corresponding to the fundamental frequency from the spectrum, calculates a first average energy of the first frequency band, sets the first average energy as a first threshold based on calculation of the first average energy of the first frequency band, and filters noise greater than the first threshold in the first frequency band to generate the first filtered spectrum.

2. The filter according to claim 1, wherein the filter module selects a second frequency band corresponding to the harmonic frequency from the spectrum, calculates a second average energy of the second frequency band, and filters the harmonic frequency according to the second average energy to generate the first filtered spectrum.

3. The filter according to claim 2, wherein the filter module sets the second average energy as a second threshold, and filters noise greater than the second threshold in the second frequency band to generate the first filtered spectrum.

4. The filter according to claim 1, wherein the filter module selects a third frequency band corresponding to the aliasing frequency from the spectrum, calculates a third average energy of the third frequency band, and filters the aliasing frequency according to the third average energy to generate the first filtered spectrum.

5. The filter according to claim 4, wherein the filter module sets the third average energy as a third threshold, and filters noise greater than the third threshold in the third frequency band to generate the first filtered spectrum.

6. The filter according to claim 1, wherein the detection module detects a secondary fundamental frequency corresponding to a secondary maximum peak in the first filtered spectrum, and detects a secondary aliasing frequency corresponding to a secondary harmonic frequency in response to the secondary harmonic frequency of the secondary fundamental frequency being greater than the Nyquist frequency, wherein the filter module filters the secondary fundamental frequency and at least one of the secondary harmonic frequency and the secondary aliasing frequency of the first filtered spectrum to generate a second filtered spectrum, and restores the input signal according to the second filtered spectrum to generate the output signal.

7. The filter according to claim 1, wherein the detection module performs a one-dimensional fast Fourier transform on the input signal to generate the spectrum.

8. A method for filtering periodic noise, comprising:

obtaining an input signal;

detecting a fundamental frequency corresponding to a maximum peak in a spectrum of the input signal, detecting a harmonic frequency according to the fundamental frequency, and detecting an aliasing frequency corresponding to the harmonic frequency in response to the harmonic frequency corresponding to the fundamental frequency being greater than a Nyquist frequency of the input signal;

filtering the fundamental frequency and at least one of the harmonic frequency and the aliasing frequency of the spectrum to generate a first filtered spectrum, comprising:

selecting a first frequency band corresponding to the fundamental frequency from the spectrum, calculating a first average energy of the first frequency band, setting the first average energy as a first threshold based on calculation of the first average energy of the first frequency band, and filtering noise greater than the first threshold in the first frequency band to generate the first filtered spectrum;

restoring the input signal according to the first filtered spectrum to generate an output signal; and outputting the output signal.

9. The method according to claim 8, wherein the step of filtering the fundamental frequency and the at least one of the harmonic frequency and the aliasing frequency of the spectrum to generate the first filtered the spectrum further comprises:

selecting a second frequency band corresponding to the harmonic frequency from the spectrum;

calculating a second average energy of the second frequency band; and filtering the harmonic frequency according to the second average energy to generate the first filtered spectrum.

10. The method according to claim 9, wherein the step of filtering the harmonic frequency according to the second average energy to generate the first filtered spectrum comprises:

setting the second average energy as a second threshold; and filtering noise greater than the second threshold in the second frequency band to generate the first filtered spectrum.

11. The method according to claim 8, wherein the step of filtering the fundamental frequency and the at least one of the harmonic frequency and the aliasing frequency of the spectrum to generate the first filtered the spectrum further comprises:

selecting a third frequency band corresponding to the aliasing frequency from the spectrum;

calculating a third average energy of the third frequency band; and filtering the aliasing frequency according to the third average energy to generate the first filtered spectrum.

12. The method according to claim 11, wherein the step of filtering the aliasing frequency according to the third average energy to generate the first filtered spectrum comprises:

setting the third average energy as a third threshold; and filtering noise greater than the third threshold in the third frequency band to generate the first filtered spectrum.

13. The method according to claim 8, further comprising:

detecting a secondary fundamental frequency corresponding to a secondary maximum peak in the first filtered spectrum, and detecting a secondary aliasing frequency corresponding to a secondary harmonic frequency in response to the secondary harmonic frequency of the secondary fundamental frequency being greater than the Nyquist frequency; and filtering the secondary fundamental frequency and at least one of the secondary harmonic frequency and the secondary aliasing frequency of the first filtered spectrum to generate a second filtered spectrum, and restoring the input signal according to the second filtered spectrum to generate the output signal.

14. The method according to claim 8, further comprising:
 performing a one-dimensional fast Fourier transform on the input signal to generate the spectrum.

\* \* \* \* \*